W. B. FORD.
AUTOMATIC CUT-OFF VALVE.
APPLICATION FILED JAN. 29, 1913.
1,081,822.
Patented Dec. 16, 1913.
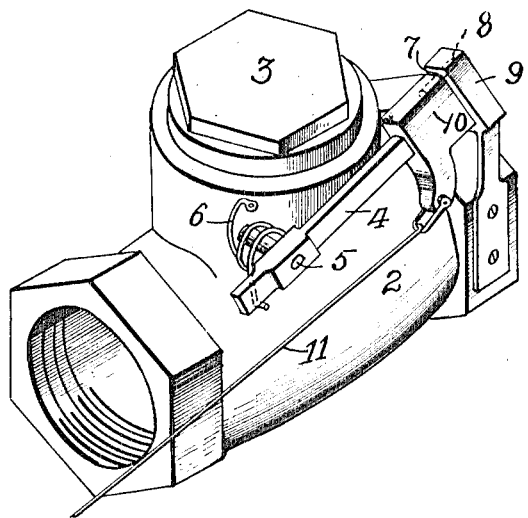
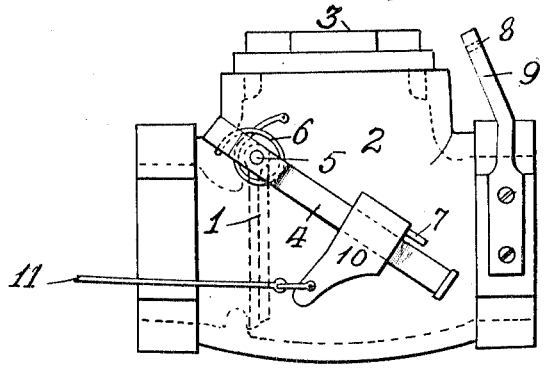
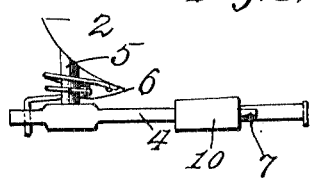
WITNESSES
INVENTOR
William B. Ford
By Knight
Attorneys

UNITED STATES PATENT OFFICE.

WILLIAM B. FORD, OF BIRMINGHAM, ALABAMA.

AUTOMATIC CUT-OFF VALVE.

1,081,822.  Specification of Letters Patent.  Patented Dec. 16, 1913.

Application filed January 29, 1913. Serial No. 744,962.

*To all whom it may concern:*

Be it known that I, WILLIAM B. FORD, a citizen of the United States, and resident of Birmingham, in the county of Jefferson and State of Alabama, have invented certain new and useful Improvements in Automatic Cut-Off Valves, of which the following is a specification.

This invention relates to a valve which will close automatically upon the development of abnormal temperature around it, in order to close flow through a pipe in which the valve is introduced in case of fire or other emergency; and particularly to that class of such valves which are designed to operate by the application of mechanical force as well as thermically.

The object of the invention is to provide a valve of this type which will be of cheap and durable construction and certain in operation; also to provide a construction in which mechanical force may be applied without destroying the thermically released element, and, incidentally, the means for mechanically releasing the valve may also be employed for introducing the detent into retaining position.

In carrying out the invention, the detent or some part thereof is constructed of a substance fusible at a temperature indicating the presence of dangerous combustion, and it is brought into engagement with a fixed part which intercepts the path in which it must move in closing the valve, as is usual in such devices, but said detent is associated with the valve by a connection which permits it to move transversely to the path of the valve closing movement, so that it may not only slip into engagement with the fixed member in the original setting of the parts, but it may be slipped out of such engagement with the fixed member by the application of mechanical force, so as to permit the valve to close independently of the fusing of the detent.

The invention will be fully understood upon reference to the accompanying drawing, in which one embodiment of the several features of the invention is shown by way of illustration.

In said drawing—Figure 1 is a perspective view of a valve with the parts in set position; Fig. 2 is a side elevation of the valve with the parts in released position, and, Fig. 3 is a detail view of the detaining parts.

1 represents a valve of any suitable construction, mounted within a casing 2, which may be provided with a plugged hand-hole 3, in addition to suitable inlet and outlet. Valve 1 is controlled by an arm 4 mounted on the valve-spindle 5, and adapted to be operated in the direction of closing by a spring 6. To retain the valve normally in open position by means which will automatically release the valve under high temperature, the valve-arm 4 is provided with a fusible detent 7 entering a recess 8 in a supporting post 9, positioned to receive the detent when the valve is open. To adapt the arm to be released at will, as by manual or other power, and incidentally to facilitate setting the automatic valve in the first place, the detent is slidably mounted on the arm, as for instance, through the medium of the block 10 which may be drawn away from the post 9, by any suitable means, such as flexible connection 11. To render the operation more certain, the arm 4 is located to assume a gravitating position when set. Moreover, the block 10 may take the form of a weight, and the flexible connection 11 may extend in a direction to assist the movement by the pull imparted to it. The spring 6 engages beneath the rear extension of the arm 4 so as to impart its force with some leverage. The tension of spring 6 may be increased, if desired, by imparting to the arm 4, a complete revolution backward. The fusible piece 7 will preferably be a short section of wire adapted to be inserted into the sliding detent 10 and, therefore, readily replaced at any time.

I claim:—

1. In combination with a valve, closing means acting automatically to close the valve when released, a fixed support, and a fusible part carried by said closing means and movable thereon into and out of engagement with said fixed support for resisting the movement of said closing means, to close the valve, and to release said closing means, respectively.

2. In combination with a valve, automatic operating mechanism for said valve, a fixed support adjacent to said mechanism, and a thermically releasable detent for normally engaging said support so as to resist automatic action of the operating mechanism and mounted on said closing mechanism with movement thereon transverse to the path of movement of said operating mechanism and by said transverse movement adapted to engage and disengage with the fixed support.

3. In combination with a valve, automatic operating mechanism for said valve comprising a swinging arm, a thermically releasable detent for said operating mechanism slidably mounted on said arm, a fixed support adjacent to said arm and into and out of engagement with which said detent is adapted to be moved by its sliding movement, to restrain or permit movement of said operating mechanism, respectively.

4. In combination with a valve, automatic operating mechanism for said valve comprising a swinging arm, a thermically releasable detent for said operating mechanism slidably mounted on said arm, a fixed support adjacent to said arm and into and out of engagement with which said detent is adapted to be moved by its sliding movement, to restrain or permit movement of said operating mechanism, respectively; said arm being in gravitating position when the valve is restrained and the detent is engaged with the fixed support.

5. In combination with a valve, automatic operating mechanism for said valve comprising a swinging arm, a thermically releasable detent for said operating mechanism slidably mounted on said arm, a fixed support adjacent to said arm and into and out of engagement with which said detent is adapted to be moved by its sliding movement, to restrain or permit movement of said operating mechanism, respectively; said arm being in gravitating position when the valve is restrained from movement and the detent is engaged with the fixed support; said detent comprising a weight which adds to the gravitating force of the arm.

6. In combination with a valve, an automatic operating mechanism including a controlling member movable with the operation of the valve, a fusibly releasable detent mounted on said controlling member, a stop normally engaged by said detent in the direction in which said controlling member moves in the operation of the valve, whereby the valve is held against operation, the connection between said detent and said controlling member being such that it permits the detent to move upon the controlling member transversely to the movement of the controlling member, and a mechanical connection for imparting said movement of the detent relatively to the controlling member, to release the detent from the stop.

7. In combination with a valve, an automatic operating mechanism including a controlling member movable with the operation of the valve, a fusibly releasable detent mounted on said controlling member, a stop normally engaged by said detent in the direction in which said controlling member moves in the operation of the valve, whereby the valve is held against operation, the connection between said detent and said controlling member being such that it permits the detent to move upon the controlling member transversely to the movement of the controlling member, and a mechanical connection for imparting said movement of the detent relatively to the controlling member, to release the detent from the stop; said mechanical connection being also adapted to apply force to the controlling member in the direction of its valve operating movement.

The foregoing specification signed at Birmingham, Alabama, this 8th day of January, 1913.

WILLIAM B. FORD.

In presence of—
C. E. LEONARD,
W. L. SIMS.